UNITED STATES PATENT OFFICE 2,152,615

PENTAMETHINE-OMEGA-ALDEHYDES OF HETEROCYCLIC BASES

Walter Zeh, Wolfen, Kreis Bitterfeld, Germany, assignor to Agfa Ansco Corporation, Binghamton, N. Y., a corporation of New York No Drawing. Application August 25, 1937, Serial No. 160,829. In Germany August 29, 1936

4 Claims. (Cl. 260—289)

My present invention relates to dyes of the polymethine series and more particularly to pentamethine-omega-aldehydes of heterocyclic bases.

It is an object of the invention to provide a process by which these hitherto unknown compounds may be prepared with a good yield. Further objects will be apparent from the detailed specification following hereafter.

This invention is based on the observation that the hitherto unknown pentamethine-omega-aldehyde heterocyclic bases having the general formula

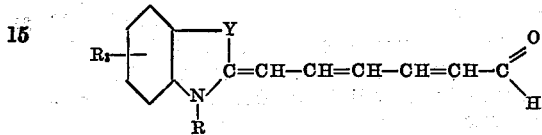

wherein

Y stands for a vinylene group, sulfur or selenium, and

R stands for alkyl, $R_3$ stands for hydrogen and alkoxy and a fused-on benzene nucleus, can be obtained in good yield by converting a quaternary salt of a nitrogen-substituted imino-hexamethine compound of a heterocyclic base of the general formula

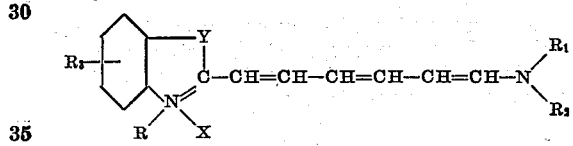

wherein

Y stands for a vinylene group, sulfur or selenium,

R and $R_2$ stand for alkyl, $R_1$ stands for an aromatic radical, and $R_3$ stands for hydrogen and alkoxy and a fused-on benzene nucleus, X stands for any desired anion into the corresponding omega-aldehyde by a treatment with an alkaline reagent. The N-alkyl-phenyl-imino-hexamethine compound to be used as parent material can be produced by the process described in U. S. Patent No. 2,131,864, dated October 4, 1938. The reaction may be carried out in the presence of a solvent, in which case the alkaline reagent is preferably used in an equivalent quantity. The alkaline reagent may be an inorganic substance, for example an alkali hydroxide or an alkali carbonate or an ethylate of an alkali metal.

The pentamethine-omega-aldehydes are useful as intermediate product in the production of cyanine dyes. They are themselves dyestuffs of the polymethine series and have the valuable property of being soluble in benzene.

The invention will be better understood by reference to the following examples, which are added for purposes of illustration, but not in limitation.

1. To produce N-ethylbenzthiazole-2-pentamethine-omega-aldehyde having the formula

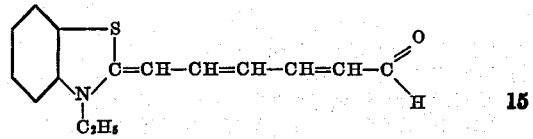

the greater part of 4.8 grams of N-methylphenyl-imino-2-hexamethine-benzthiazole ethyl iodide is dissolved in 50 cc. of hot methanol, and the whole is mixed with a solution of 0.7 gram potassium carbonate in 10 cc. of water. The mixture is heated on the water bath until the absorption band of the hexamethine dyestuff has given place to the broad absorption band of the pentamethine aldehyde. The aldehyde which has separated in the form of small needles crystallizes from alcohol in the form of orange-red prisms (melting point 158° C. uncorrected). The alcoholic solution of the aldehyde has a weak absorption band at about 5100 Å. U.

2. A mixture of 5.2 grams of N-methylphenyl-imino-2-hexamethine-benzselenazole ethyl iodide and 50 cc. of methanol is heated to boiling and 10 cc. of a solution of sodium ethylate containing 3 per cent of sodium are added. The mixture is heated until the absorption maximum of the anilide dyestuff disappears. On cooling, the N-ethylbenzselenazole-2-pentamethine - omega - aldehyde separates in the form of orange-red crystals. The yield is nearly quantitative.

3. By acting as in Example 2 on N-methyl-phenylimino-2-hexamethine-5-methoxy-benzselenazole ethyl iodide, 1-ethyl-5-methoxybenzselenazole-2-pentamethine aldehyde of the probable formula

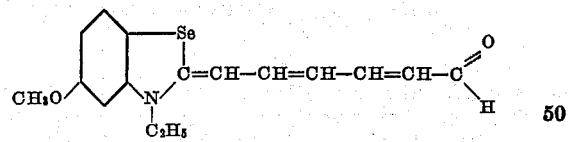

is produced. The aldehyde gives an orange solution in alcohol. The alcoholic solution has a broad absorption band with a maximum at about 5000 Å. U.

4. A mixture of 5 grams N-methylphenylimino-2-hexamethine-4:5 benzobenzthiazole ethyl iodide and 50 cc. of methanol is heated to boiling and then there are added 6 cc. of an aqueous sodium corbonate solution of 10 per cent strength. The mixture is boiled until the original blue color has become orange-red. The 1-ethyl-4:5-benzobenzthiazole-2-pentamethine-omega-aldehyde which separates crystallizes from alcohol in brownish-red drusiform crystals. The alcoholic solution of the aldehyde has a broad absorption band at about 5250 Å. U.

5. 4.7 grams of N-methylphenylimino-hexamethine-6-methylquinoline ethyl iodide are dissolved in 50 cc. of methanol and the solution is mixed with 6 cc. of potassium hydroxide solution of 10 per cent strength. The mixture is boiled until the blue color of the hexamethine dyestuff is completely converted into the violet-red of the aldehyde. On cooling, the N-ethyl-6-methylquinoline - 2 - pentamethine - omega - aldehyde separates in coalescing brown-red crystals. The alcoholic solution has a very broad absorption band at about 5300 Å. U.

6. 1/100 mol of a compound of the following formula

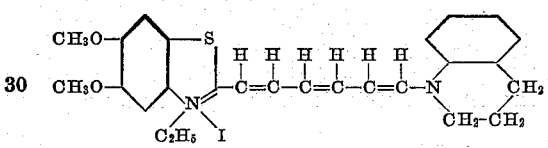

which is produced from 2-methyl-5.6-dimethoxy-benzthiazole-ethyl iodide and pentamethine-di(tetrahydroquinoline)-hydro-bromide according to British Patent 438,449 is suspended in 50 cc. of methanol and heated to boiling. Only a small part of the compound is dissolved. There are added 1/100 mol. sodium hydroxide in methanol in small portions while the solution is kept boiling. The dyestuff is gradually dissolved and the color of the liquid changes from blue to red. After complete dissolution and after the color of the starting material has disappeared the resulting aldehyde of the following formula

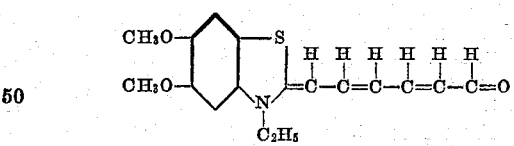

is precipitated by cautiously adding water. There is produced brown-red crystals soluble in methanol with brown-red color and with blue-red color in chloroform. It is also possible to shake out the aldehyde from its suspension by means of chloroform.

The maximum of absorption in methanolic solution lies at about 5350 Å. U. The absorp-band is indistinct.

7. The aldehyde of the following formula

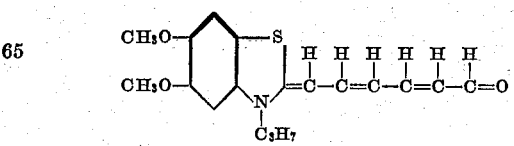

is produced as described in Example 6, the only difference being that as a starting material the reaction product of 2-methyl-5.6-dimethoxy-benzthiazole-propyl iodide and pentamethine-di-tetrahydroquinoline)-hydrobromide is used. The aldehyde has the same properties and the same maximum of absorption as the one described in Example 6.

8. The aldehyde of the following formula

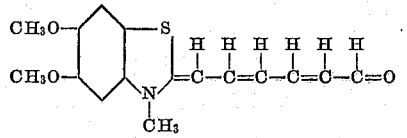

is produced in the manner described in Example 6, only as a starting material there is used the reaction product of 2-methyl-5.6-dimethoxy-benzthiazole-methyl-sulfo-methylate and pentamethine-di(tetrahydroquinoline)-hydrobromide.

The properties of this aldehyde are approximately the same as those of the aldehyde of the foregoing examples.

9. The aldehyde described in Example 6 may also be produced according to the following process:

1/1000 mol of 2-methyl-5.6-dimethoxy-benzthiazole-ethyl-paratoluene-sulfonate and 1/1000 mol of pentamethine-di(tetrahydroquinoline)-hydrobromide are suspended in a few cc. of methanol. The suspension is boiled up, whereby not everything is dissolved. A drop of piperidine is now added and the solution is caused to boil again. The solution changes its color to blue. The addition of piperidine is repeated several times until the spectroscopic examination of the solution shows only the resulting blue dyestuff. When this is the case, a few drops of a solution containing 30 per cent potassium bromide are added and the entire solution is cooled. There is precipitated a crystallized intermediate product of the following formula

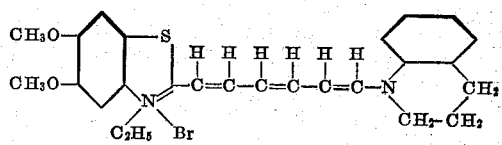

This intermediate product is suspended in a little methanol and treated in the manner described in Example 6.

What I claim is:

1. A process of producing pentamethine-omega-aldehydes of heterocyclic bases, which process comprises treating with alkali a compound of the following general formula

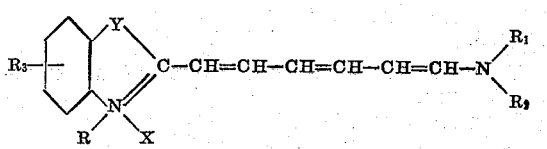

wherein
X is one of the group consisting of —CH=CH—, Se, S,
R is alkyl,
R₁ is an aromatic radical,
R₂ is one of the group consisting of alkyl and (jointly with R₁) a hydroaromatic radical,
R₃ is one of the group consisting of hydrogen, a fused-on benzene nucleus and the alkoxy-groups,
while
X is an anion.

2. A process of producing pentamethine-omega-aldehydes of heterocyclic bases, which process comprises adding to a liquid containing a compound of the following general formula

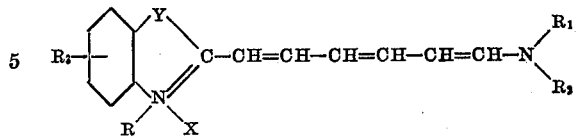

wherein
Y is one of the group consisting of —CH=CH—, Se, S,
R is alkyl,
$R_1$ an aromatic radical,
$R_2$ is one of the group consisting of alkyl and (jointly with $R_1$) a hydroaromatic radical,
$R_3$ is one of the group consisting of hydrogen, a fused-on benzene nucleus and the alkoxy-group,
while
X is an anion;
a strong alkali, heating said liquid until the change of color is complete.

3. A process of producing pentamethine-omega-aldehydes of heterocyclic bases, which process comprises adding to a liquid containing a compound of the following general formula

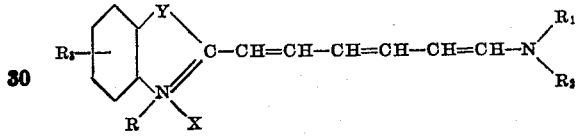

wherein
Y is one of the group consisting of —CH=CH—, Se, S,
R is alkyl,
$R_1$ is an aromatic radical,
$R_2$ is one of the group consisting of alkyl and (jointly with $R_1$) a hydroaromatic radical,
$R_3$ is one of the group consisting of hydrogen, a fused-on benzene nucleus and the alkoxy-group,
while
X is an anion;
a strong alkali, heating said liquid until the change of color is complete and separating the aldehyde from said liquid.

4. Pentamethine-omega-aldehydes corresponding with the following general formula

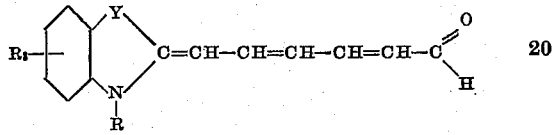

wherein
R is alkyl,
Y is one of the group consisting of —CH=CH—, Se, S,
$R_3$ is one of the group consisting of hydrogen, a fused-on benzene nucleus and the alkoxy-group.

WALTER ZEH.